June 5, 1928.

R. A. HEISING

1,672,215

WAVE VARYING AND TRANSMITTING

Filed Aug. 15, 1923  4 Sheets-Sheet 1

Inventor:
Raymond A. Heising
by E.W. Griggs  Att'y

*Inventor:*
Raymond A. Heising
by E.W. Griggs  Att'y

June 5, 1928.

R. A. HEISING

WAVE VARYING AND TRANSMITTING

Filed Aug. 15, 1923    4 Sheets-Sheet 3

1,672,215

Inventor:
Raymond A. Heising
by W. Griggs   Atty

June 5, 1928.

R. A. HEISING 1,672,215

WAVE VARYING AND TRANSMITTING

Filed Aug. 15, 1923    4 Sheets-Sheet 4

Inventor:
Raymond A. Heising
by  E.W. Griggs   Atty

Patented June 5, 1928.

1,672,215

UNITED STATES PATENT OFFICE.

RAYMOND A. HEISING, OF MILLBURN, NEW JERSEY, ASSIGNOR TO WESTERN ELECTRIC COMPANY, INCORPORATED, OF NEW YORK, N. Y., A CORPORATION OF NEW YORK.

WAVE VARYING AND TRANSMITTING.

Application filed August 15, 1923. Serial No. 657,483.

This invention relates to systems for and methods of producing electrical waves and modifying them in accordance with signals or other effects to be transmitted.

Among the objects of the invention are to provide more efficient modes of utilizing electrical energy in the production and modulation of carrier waves; to improve the power efficiency of electron discharge amplifying systems; to modulate electrical waves with increased effectiveness and decreased distortion; to improve the modulating efficiency of electron discharge device systems; to increase the effectiveness of modulation by the utilization of special waves of other than the wave form of speech currents; to carry each of the foregoing objects into effect in combination with methods for wholly or partly suppressing the unmodulated component of carrier frequency; and to carry each of the foregoing objects into effect in connection with the method of suppressing one side band of signal modulated waves.

In one embodiment involving certain features of the invention, speech frequency and intermediate super-audio frequency waves of the same order of amplitude are impressed together in the grid circuit of a vacuum tube. A resistance of suitable magnitude is connected across the grid and filament of this tube in such a manner that impressed potentials of considerably less than the peak value of the impresed waves cause the grid to become positive to an extent limited by the relatively low impressed voltages and correspondingly limit the anode-cathode space current. The result is the production in the output circuit of a flat topped wave. A similar process can be repeated in several stages to increase the flatness of the wave top and the steepness of its sides, thereby approximating a square topped wave, the production of which is facilitated by using resistance couplings between the various tube stages and avoiding the use of inductance. Such a tube, or tandem arrangement of tubes, with appropriate input and output connections is, in this specification, hereinafter styled a "wave former". The resultant electromotive force produced by the "wave former" is a succession of square topped impulses which occur in regular sequence and at approximately equal intervals but are of varying length—the variation being in accordance with the amplitude of the speech wave at successive instants of time. These square topped impulses are impressed upon a large inductance across which is connected a rectifier and a condenser. The action of this rectifier-inductance combination is to produce a succession of discharges into the condenser—the charge of the successive discharges being proportional to the length of the corresponding flat topped impulses. A filter connects the condenser to an oscillation generator which produces oscillations to be modulated. The transmission band of this filter is such as to pass freely all frequencies below about the mean of the intermediate frequency and the highest speech frequency. If the intermediate frequency is 20,000 cycles, then the filter may conveniently pass all frequencies below 12,000 cycles and suppress all higher frequencies. Thus there is transferred to and impressed upon the high frequency oscillator a modulating current of large energy which has been produced from a relatively feeble voice current in a manner involving efficient energy utilization. The intermediate frequency employed may range, in telephone systems, from a relatively low to a relatively high value as, for example, 5,000 to 200,000 cycles per second and the high frequency may extend over a similarly wide range for example, from 100,000 to several million cycles per second. Illustrative values are: intermediate frequency, 20,000 cycles; transmission limit of cut-off filter, 12,000 cycles; high frequency, 100,000 cycles per second.

Certain modified forms of the invention are described hereinafter, the particular nature of each modification being briefly set forth in connection with the following brief description of the several figures of the drawing to which reference is made for a more complete explanation of the nature, objects and advantages of the invention and the methods of carrying it into effect.

Fig. 1 is a circuit diagram of the essential elements of an embodiment of the invention in which a "wave former" is used to transform modulated oscillations into flat topped impulses whose length is modulated and which are then impressed upon a high frequency generator to cause it to produce modulated oscillations; Fig. 1ª is a modified form of that part of Fig. 1 between the lines P—P and Q—Q; Fig. 1ᵇ is an alternative arrangement in which a separately excited high frequency amplifier is substituted for the oscillator or, in other words, for that portion of Fig. 1 to the right of the line W—W.

Fig. 11ª is a modified form of Fig. 11 in which an arrangement for producing a single side band of a speech modulated wave is substituted for the devices of Fig. 11 which produce the key-interrupted wave; Fig. 11$^b$ is a modified form in which an entire modulated wave takes the place of the key-interrupted wave; and Fig. 11$^c$ is a modified form in which the power tube amplifier of the system of Fig. 11 is supplied with a speech modulated current supply.

Figs. 13 and 14 are diagrams for explaining the operation of the system of Fig. 12.

Figures 1, 1A, 1B:
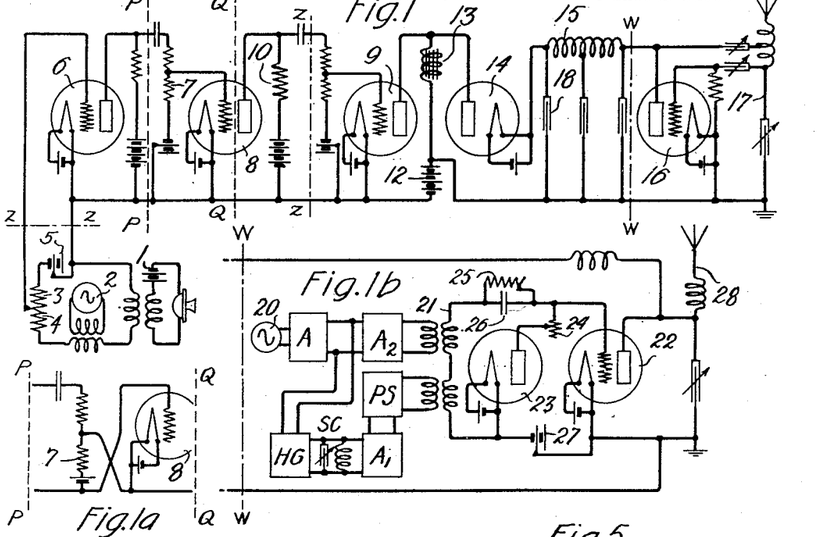
Figure 2:
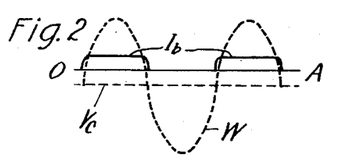
Figs. 2, 3, 4, 5, 6, 7, 8, 9 and 10 are current and voltage diagrams for explaining the operation of the system of Figs. 1 and 1ª.

In Fig. 1, the microphone circuit 1 indicates any suitable source of speech or signaling waves, such as a telephone line. An oscillation generator 2 supplies carrier waves of a suitable frequency, for example, 20,000 cycles. The speech and carrier waves are impressed upon two resistances 3 and 4 arranged in series. The resistance 3 together with the polarizing battery 5 is included in the grid-filament circuit of an electron discharge repeater 6. In order to simplify the following explanation, let it be assumed that the generator 2 is operating but that no waves are being produced in the microphone circuit 1. The battery 5 and the resistances 3 and 4 are so proportioned with respect to each other and with respect to the amplitude of waves produced by the device 2 that positive half cycles of the 20,000 cycle waves impressed by device 2 upon the grid-filament circuit of the device 6 render the grid so positive that the space current consists of flat topped impulses. Furthermore, the battery 5 is of such electromotive force as to produce a normal condition of zero or very small space current from the plate to the cathode of the tube 6. The operating results may be explained by reference to Fig. 2. In Fig. 2, the line OA represents the zero axis; the line V$_c$ represents the normal negative potential of the grid; the sinusoidal curve W represents the impressed wave; and the flat-topped curve I$_b$ represents the resultant space or plate-filament current. Current I$_b$ thus approximates a series of flat-topped impulses. By a succession of steps each comprising an amplification of the impressed flat-topped wave and the cutting off of such amplified wave the amplitude and energy of these impulses may be increased and their wave form may be made to approximate a flat-topped and perpendicularly sided series of impulses within a sufficient degree of approximation, thereby producing the theoretically correct wave form indicated by I$_b$ in Fig. 4.

Figure 3:
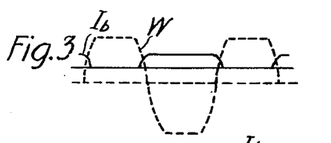

The condenser connected in series with resistance 7 in the output circuit of the tube 6, serves to prevent direct current from traversing this path, but permits alternating current to flow through the resistance 7. An increase of current flowing in the plate-filament circuit of the tube 6 produces such a change of current flowing through the resistance 7, which is included in the input circuit of the tube 8, as to make the grid more negative. Consequently, it may be advisable not to have a normally zero space current through the tube 8, but to have a finite value of space current which is reduced to zero. The degree of polarization of the grid of tube 8 is much less than the change of potential which is produced by the maximum increase of current through the plate filament circuit of tube 6. This condition is illustrated in Fig. 3 where I$_b$ similarly as in Fig. 2, represents the resultant impulse current flowing in the plate-filament circuit of tube 8, its maximum value (unlike the maximum value of the corresponding current in Fig. 2) being the space current normally flowing through the tube, and W represents the summation of alternating components of the current flowing through the plate-filament circuit of tube 6, which is opposite in phase to the potential wave impressed on the grid of tube 8. For the case illustrated it is assumed that the biasing potential of the grid of tube 8 is normally so great that the positive half waves of potential impressed on it (corresponding to the negative half wave of current W) are not effective for increasing the current flowing in its plate-filament circuit. With other adjustments of the normal biasing potential, this current could be made to increase from the normal value before flattening, as well as to decrease to zero. As an alternative arrangement, it may be desirable to reverse the connections of the input circuit of the tube 8 to the resistance 7, as shown in Fig. 1ª, which is an alternative arrangement for that portion of the circuit of Fig. 1 comprised between the dotted lines P—P and Q—Q and using a zero normal space current. In Fig. 1ª, an increase of current through the resistance 7 causes the grid of the tube 8 to become more positive. In such an arrangement, the current relations will be as indicated in Fig. 2 with the exception, of course, that the impressed wave W will be flat-topped as in Fig. 3 and the operations involving this tube will be the same as those involving tube 6. If additional tubes are used in the process of forming the wave their operations may partake of either of the above described modes of operation, or of that described in the next paragraph.

It should be understood that, also with the connections as shown in Fig. 1, as distinguished from those shown in Fig. 1ª which have been treated immediately above, the tube 8 may have its grid polarized so that normally no space current will pass. In such a case,—the variation of current to produce the impulses results from the negative half waves of the current W, that is, the positive half waves of the potential impressed on the grid of tube 8. This operation is strictly analogous to that of the modification illustrated by Fig. 1ª, differing only in that use is made of different half waves of the current W. In general the grid voltage of tube 8 may have any value provided the operating condition is such that a change of grid voltage results in a change of space current flow.

Figure 4:
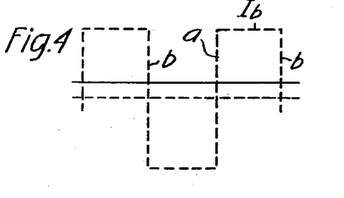

Figs. 2, 3 and 4 may therefore be assumed to indicate the successive changes which occur as the result of the operation of a plurality of tubes, such as 6 or 8, or a combination of them, it being assumed that points lying in a vertical line one above the other in Figs. 2, 3 and 4 indicate corresponding instants of time in the several figures and it being understood that an indefinite number of such operations may be involved, the number depending on the degree of angularity, and the amplitude, desired in the finally produced wave. The curve $I_b$ (Fig. 4) represents the ideal form of resultant electromotive force in the anode-cathode circuit of the last tube in such a series and the space current therethrough on the assumption that the external impedance were a uniform resistance. The tubes 6 and 8 and their associated elements may be considered to be a "wave former", the object of which is to convert half cycles of a sinusoidal impressed wave into corresponding flat-topped impulses. The operation of the "wave former" is improved by avoiding inductive reactance in the input and output circuits of the tubes.

The tube 9 may be viewed as an intermediate frequency power amplifier having normally zero space current. The flat-topped impulses illustrated in Fig. 4 are impressed on its input circuit. The grid of this power amplifier is made positive at $a$ (Fig. 4) and negative at $b$ (Fig. 4). The plate circuit of the tube 9 includes a battery 12 of high electromotive force and little reactance and a coil 13 of high inductance. Across the coil 13 is connected a rectifier 14 to which is connected a filter designed to pass all frequencies below 12,000 cycles per second and to exclude all materially higher frequencies. To the output side of the filter 15 is connected a vacuum tube 16 which functions as a generator of oscillations in the antenna circuit 17. The oscillation generator may be of any known type which will produce oscillations modulated in accordance with variations in the direct current supplied thereto.

Figure 5:
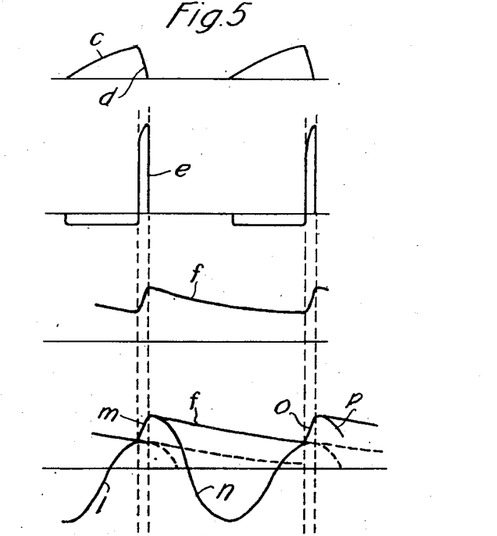

In Fig. 5 is shown a series of curves for explaining the operation of tube 9 and the rectifier 14. When the grid of tube 9 becomes positive as at points $a$ (Fig. 4) the impedance of the tube 9 becomes very small. Almost the entire voltage of the battery 12 is then impressed across the inductance 13 and the current through the inductance begins to rise as shown in the curve $c$ (Fig. 5). The current continues to rise through the inductance until the grid of the tube is again made negative, as at point $b$ (Fig. 4). When this occurs, there is a large current flowing through the inductance 13 and considerable energy is stored therein. As the tube 9 almost instantly becomes of very high impedance, inductance 13 discharges through the rectifier 14, the descreasing current following the curve $d$. The voltage across the inductance 13 follows the wave form of the curve $e$ (Fig. 5). The curve $f$ (Fig. 5) represents the voltage across the condenser 18. When the current through the coil 13 is increasing, the voltage across the condenser 18 is slowly falling. When the coil 13 discharges through the rectifier 14, an additional charge is forced into the condenser 18, thereby increasing the voltage there across. The curve $f$ comprises a fundametal frequency corresponding to the frequency of the intermediate carrier frequency source 2 with various harmonic components. When the voltage corresponding to the curve $f$ recurs regularly the current supplied to the oscillation generator 16 will be substantially constant and the oscillations produced will be constant. As pointed out hereinafter, the filter 15 suppresses not only all frequencies in the neighborhood of the frequency of the source 2 but of higher frequencies. (The curves on the bottom axis of Fig. 5 do not apply to Fig. 1 but are used hereinafter in explaining Fig. 11.) The operation, as so far described relates to the condition in which no waves are being produced in the microphone circuit 1 and no modulation is being effected.

Figure 6:
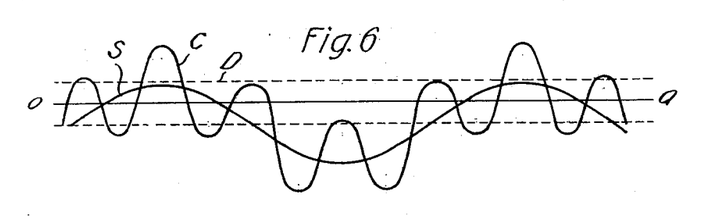
Figure 7:
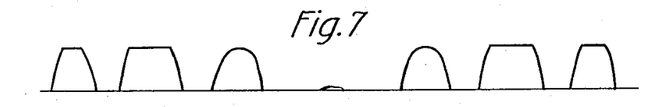
Figure 8:
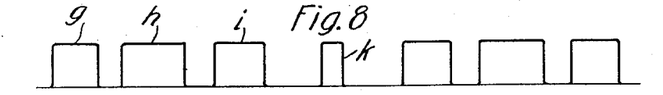
Figure 9:
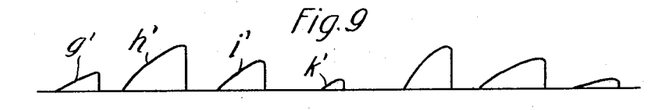
Figure 10:
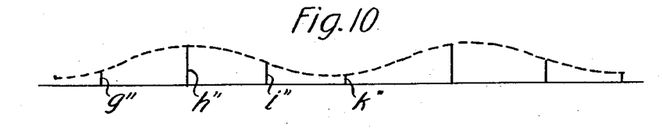

The operation of Fig. 1 as a modulating system when waves are being produced in the microphone circuit 1 will now be explained by reference to Figs. 6, 7, 8, 9 and 10. In Fig. 6, OA represents the zero axis; the curve S the signaling voltage introduced in the microphone circuit 1; and C the voltage of the intermediate carrier frequency. As shown in Fig. 6, the voltage of the intermediate carrier frequency is superposed upon the signaling current S so that the curve C in Fig. 6 may be taken to represent the voltage impressed upon the input circuit of the vacuum tube 6. Curve D (Fig. 6) represents the maximum current flow in the output circuit of tube 6. Hence, as shown in Fig. 7, there will be produced in the plate circuit a series of impulses of variable length resulting from the peaks of the input impulses of higher amplitude being flattened or cut off. By repeating the wave forming process as often as necessary, the series of impulses indicated in Fig. 7 will assume the form indicated in Fig. 8, wherein all the impulses are of substantially uniform amplitude but vary in length proportionally to the maximum amplitude of that particular portion of the curve C (Fig. 6) from which they were derived. The net result is to form a series of impulses modulated in length rather than amplitude. These impulses represent the voltage applied to the grid circuit of the vacuum tube 9. The grid voltage of this tube is normally adjusted to pass little or no space current. As shown in Fig. 5, when the impulses are assumed to be of uniform length, current through the inductance 13 arises to the same amplitude as a result of each impulse. When the impulses are modulated in length or duration, as indicated in Fig. 8, the current through the inductance 13 will rise each time to a height approximately proportional to the length of the corresponding impulse. This condition is illustrated in Fig. 9, wherein are indicated a series of current impulses $g'$, $h'$, $i'$ and $k'$ through the inductance 13 corresponding to a series of impulses $g$, $h$, $i$ and $k$ of varying length impressed upon the grid of the tube 9. The maximum values or amplitudes of the series of impulses $g'$, $h'$, $i'$ and $k'$ are proportional to the maximum values, or amplitudes, of the impressed signal waves. These values are indicated by the series of ordinates $g''$, $h''$, $i''$, and $k''$, (Fig. 10). The energy transferred to the oscillator is proportional to the square of these amplitudes since the energy transferred to the capacity from the inductance in each cycle is $\frac{1}{2} LI^2$, where I is the maximum current in the inductance and L is the inductance. This is exactly what is desired, since the envelope of these amplitudes has the form of the impressed signal wave. As the filter 15 is designed to pass current variations of all frequencies below 12,000 cycles per second, the signaling frequency variations will be transferred through the filter 15 and the plate circuit power to the oscillator 16 will vary in accordance with these variations. Consequently, the oscillation generator will produce high frequency carrier waves modulated in accordance with the signaling currents in the microphone circuit 1. These high frequency carrier currents may be of large power if the amplification occurring in the wave former 6, 8 is sufficient to produce energy capable of modulating high power oscillations. The necessary amplification of the speech currents can be effected in a system of this type in such a manner that the total energy supplied to the amplifier system is efficiently utilized due to the fact that the vacuum tubes are practically all the time working at zero current and high impedance (resistance) or finite current and low impedance (resistance). For this condition, which is identified by the angular characteristic of the wave, the losses in the plate-filament circuit of the tubes is low and the efficiency correspondingly high. The power for the higher frequency generator does not come direct from an ordinary current supply source but is produced by rectification of the special form of fluctuating current wave supplied by the wave former device. The modulation results entirely from the proper varying of the special wave.

In Fig. 1$^b$ is illustrated one of the possible forms of high efficiency oscillation generators which may be substituted for the oscillation generator 16. Fig. 1$^b$ therefore is a substitute for that portion of the circuit of Fig. 1 which lies to the right of the broken line WW. In Fig. 1$^b$, a triode oscillator or other source 20 furnishes sinusoidal carrier waves of any desired frequency, for example, 100,000 cycles. These waves are amplified by an amplifier A and supplied to a harmonic generator HG, a device well known in the art, which produces a series of multiple frequencies including the triple frequency component i. e. 300,000 cycles. The triple frequency component is selected by any suitable type of selective circuit SC conveniently illustrated as a simple tuned circuit. The selected triple frequency component is amplified to any desired extent by a thermionic amplifier $A_1$. The amplified triple frequency component and wave energy from the source 20, further amplified if desired by amplifier $A_2$, are both impressed upon a circuit 21. A phase shifter PS, a device well known in the art, is adjusted to change the phase of the triple frequency component, if any change is necessary, so that it has the phase relation with respect to the fundamental necessary to produce a wave of peaked wave form. The waves in the circuit 21 constitute the carrier wave which is to be modulated in accordance with speech or other signals. The circuit 21 comprises the input circuit of a high efficiency power amplifier or modulated high frequency producer 22. Across the grid-filament circuit of the amplifier 22 is connected a rectifier 23 in series with a variable resistance 24. The elements 23 and 24 are shunted with respect to the grid-filament path of the tube 22 by a variable resistance 25 and a condenser 26. A grid porlarizing battery 27 is adjusted to such a value that only a small or negligible space current flows in the amplifier 22 when no waves are being supplied from the source 20. Incoming high frequency waves from the amplifier $A_2$ and the phase shifter PS have their energy partially rectified and cause the grid potential of the tube 22 to fall to a still more negative value. Only the peaks of the incoming waves tend to cause space current to flow in the amplifier 22. The space current supplied to the amplifier 22 is a speech modulated wave supplied from the output circuit of the filter 15. The antenna circuit or radiating aerial 28 is preferably sharply tuned to the fundamental frequency of the source 20 i. e. 100,000 cycles per second. The waves of peaked wave form supplied to the input circuit of the power amplifier 22 impulsively excite the antenna circuit 28 to produce therein high frequency oscillations. The impulsive excitation and consequently the amplitude of the produced waves is varied in accordance with the signaling waves in the circuit 1.

Figure 11:
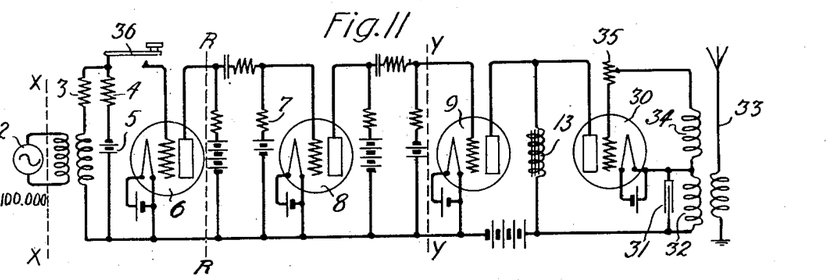
Fig. 11 is a circuit diagram of the essential elements of a form of the invention in which a key-interrupted wave is impressed upon an impulse amplifier which is directly coupled to an antenna.

Fig. 11 represents a modified form in which the waves radiated by the antenna circuit are of the same frequency as those supplied by carrier source 2 which may have any suitable frequency as, for example 100,000. The waves from the source 2 are supplied through a series of elements 3, 4, 5, 6, 7, 8 and 9 which function as the correspondingly identified elements of Fig. 1 function when carrier waves only, without signaling waves, are applied. Fig. 11 may be modified in accordance with Fig. 1ᵃ in the same way as Fig. 1 may be thus modified. A telegraph key for interrupting the waves in accordance with a code is a typical form of signaling device which may be used in this circuit. The waves supplied to the device 30 from the tube 9 and inductance 13 constitute a uniform series of impulses, such as $e$ (Fig. 5). The operation of the device 30 and its associated elements will now be described.

The device 30 is a vaccum tube repeater of the three-electrode type having associated elements so arranged as to increase the operating efficiency. For more perfectly illustrating its operation, reference will be made to Fig. 5, including the curves on the lowest axis of the figure. The curve $c$ represents the current through the inductance 13 and the curve $e$ the voltage across this inductance. The curve $f$ is repeated upon the bottom axis and represents the voltage across the condenser 31 upon the hypothetical assumption that the condenser was shunted by a resistance of suitable finite value. The actual voltage across the condenser 31 is represented by the irregular curve consisting of the sections $l$, $m$, $n$, $o$, and $p$. When the inductance 13 discharges into the condenser 31, the condenser receives an additional charge represented by the portion of the curve marked $m$. If the condenser 31 were shunted by resistance 7, the voltage across the condenser would fall off in accordance with the curve $f$. However, at the time the condenser is charged up in accordance with the portion of the curve $m$, it begins to discharge through the inductance 32. As the condenser 31 and the inductance 32 form a resonant combination, the discharge of the condenser will be carried so far as to charge the condenser partially in the opposite direction, thereby causing the potential across it to execute a portion of a damped sinusoidal curve $n$. However, at about the time the first cycle of the curve $n$ has been completed and the curve $n$ has swung above the axis to touch the curve $f$, the condenser will suddenly receive another charge, thereby raising its potential in accordance with the portion of the curve $o$. This cycle of operation will be repeated over and over. Inasmuch as the curve $l$, $m$, $n$, $o$ and $p$ is approximately sinusoidal, the tuned antenna 33 will be caused to execute sinusoidal oscillations. The energy transferred to the antenna from the circuit 31 will be principally of the frequency of the fundamental wave.

As shown at the bottom of Fig. 5, the condenser 31 after being charged up begins to oscillate in combination with the inductance 32 as a part of a tuned circuit and the voltage across the condenser proceeds to execute the curve $n$. When the voltage across the condenser 31 reaches its lowest point, as indicated at the lower part of curve $n$, the condenser tends to send current through the plate-filament path of the tube 30 and the inductance 13. This is prevented by having the coil 34 connected to and so inductively related to the coil 32 that as soon as the condenser 31 and coil 32 are positive on their lower terminal as compared to the upper terminal, the coil 34 will have an electromotive force induced in itself, which makes the grid negative with respect to the filament. This causes the impedance of the tube 30 to rise to such a value that the energy stored in the condenser 31 cannot be dissipated by sending current through any path except through the coil 32. When the voltage on the condenser has executed almost a complete cycle so as to reach the point where the curve $n$ touches the curve $f$, the lower side of the condenser 31 is negative with respect to the filament of tube 30 and the inductive connection between coils 32 and 34 causes the grid of the tube 30 to become positive with respect to the filament. The resistance 35 prevents the grid from becoming positive more than a few hundred volts with respect to the filament, assuming that the maximum plate voltage is of the order of several thousand volts. The best condition is to have the grid become positive by that amount which will cause the anode-cathode resistance of the tube 30 to be a minimum. The tube, therefore, will have low impedance during the time when current should pass through it, and will have practically infinite impedance at the time when no current should pass through it. The succession of discharges by the inductance 13 into the condenser 31 causes the voltage across the condenser to have the irregular shape indicated in Fig. 5, but this can be resolved by the principles of Fourier analysis into a fundamental wave and numerous harmonics. The harmonics will be largely eliminated by the tuning of the antenna circuit 33.

The operation of the system of Fig. 11 is such as to produce in the antenna 33 high power waves of the frequency produced by the low power source 2. In Fig. 11 is shown a key 36 for interrupting the waves in order to signal. Tubes 9 and 30 operate in a highly efficient manner inasmuch as they have at all times either a large current flowing through a small tube resistance or practically zero current flow when the tube resistance is large. Likewise the tube 6 is operated in a similar highly efficient manner, although the power saving in the case of this tube is less than in the case of the tubes 9 and 30, which handle much larger energies. Since the tube 8 when operating as described normally has finite space current, its efficiency will be somewhat less. The power handled by the tube 8 is intermediate that of the tube 6 and the tube 9. However, by reversing the connections of the tube 8 in the manner indicated in Fig. 1ª, or by adjusting the normal space current to zero like tube 6, operation will be satisfactory, and it may be made to function as efficiently as the tubes 6 and 9.

Figures 11A, 11B, 11C, 13, 14:
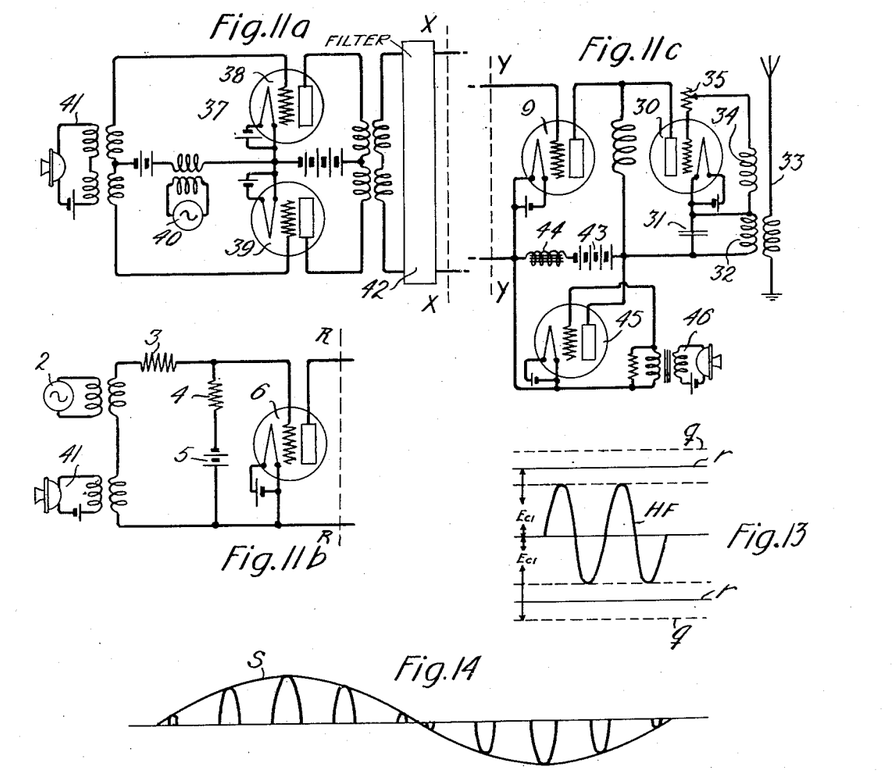

Systems similar to Fig. 11 may operate to transmit speech or other modulated waves as well as waves of uniform amplitude. Fig. 11ª shows a modified arrangement which may be substituted for that part of Fig. 11 to the left of the line X—X which is adapted for transmission of one or two side-bands of a modulated wave with the carrier suppressed. In the operation of this modified form, the key 36 should be permanently closed or replaced by a permanent connection. The modified apparatus consists of a well-known type of balanced modulator 37 consisting of the oppositely connected tubes 38 and 39, to the input circuit of which is connected a source 40 of high frequency waves and a source 41 of speech frequency waves. The operation of such a balanced modulator arrangement is well known. (See paper by Colpitts and Blackwell entitled "Carrier Current Telephony and Telegraphy" in the Journal of A. I. E. E., Vol. 40, April 1921.) A band-pass or other filter 42 preferably suppresses one side-band of the modulated wave, although it is optional to have the filter 42 transmit both side-bands thereof. The operation of Fig. 11 modified in accordance with Fig. 11ª will be obvious from the preceding description.

Fig. 11ᵇ is a modification of that portion of Fig. 11 to the left of the line R—R, and is adapted for the production and transmission of modulated waves from which the unmodulated carrier component is not suppressed. The elements 2, 3, 4, 5 and 6 function as described in connection with Fig. 11. The microphone circuit 41 supplies modulating waves. The tubes 6 and 8 constitute a "wave-former" and the inductance 13 an energy storing element. The current impulses discharged into the condenser 31 from the inductance 13 will vary in amplitude in accordance with the instantaneous amplitudes of the speech modulated waves introduced into the system. Correspondingly modulated waves will be radiated from the antenna 33.

Fig. 11ᶜ shows a modification of that portion of Fig. 11 to the right of the line Y—Y. In this arrangement continuous waves produced by the source 2, after passing through the wave-former, actuate the tube 9, which is provided with a speech modulated current supply. The tube 9 therefore acts as a circuit opener and closer for commutating energy at the rate set by the high frequency wave which is established by the source 2. The power supply for the tube 9 may consist of any suitable power modulating system, such as a constant current or constant potential system. The drawing illustrates a constant current system in which a plate current source 43 supplies current to the tubes 9 and 45 in parallel through a circuit including highly inductive speech frequency choke coil 44. Tube 45 is controlled by the microphone circuit 46. Modulated high frequency impulses will be discharged through the tube 30 into condenser 31. The condenser 31 will oscillate in connection with the coil 32 and set up oscillations in the antenna 33 as described in connection with Fig. 11. The coil 34, the resistance 35 and the grid of the tube 30 are used as in Fig. 11 and function in a similar manner.

Figure 12:
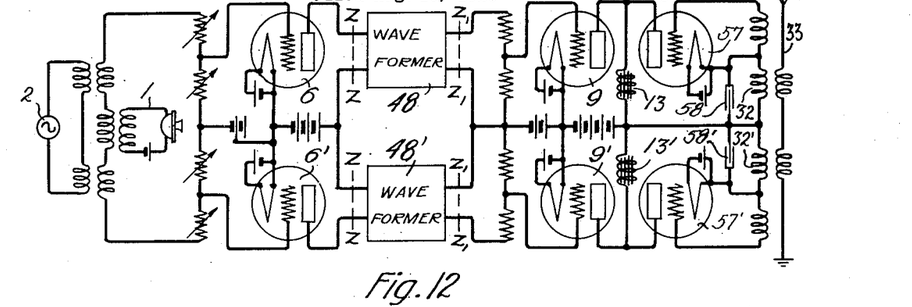
Fig. 12 is a circuit diagram of the essential elements of a form of the invention in which a modulated wave from which the unmodulated component of carrier frequency is suppressed, is radiated.

Fig. 12 illustrates an arrangement more desirable in some respects for the transmission of carrier waves from which the unmodulated component has been suppressed. The source 1 and the carrier wave generator 2 are coupled to the input circuits of two oppositely related wave-forming systems. The tubes 6 and 6 constitute the first members of these systems. Between each pair of lines Z—Z and Z—Z may be connected one, two, or more additional wave forming tubes of the type indicated in Fig. 1 between the lines Z—Z. Each wave forming system supplies a square-topped wave to the input circuit of tubes 9, 9' which feed into energy storing inductances 13 and 13'. which in turn supply impulses of current through the tube 30 and 30'. Each of the tubes 30 and 30' set up oscillations in their respective tuned output circuits 31, 32 and 31', 32', thereby impressing the oscillations upon the antenna 33.

The operation of the system of Fig. 12 may be elucidated by reference to Figs. 13 and 14. In Fig. 13, $Ec^1$ represents the negative grid voltage upon the respective wave forming tubes 6 and 6'. This voltage is such that no space current flows in either tube even with a fair high frequency voltage, represented by curve HF, impressed upon the input circuit. The high frequency voltage is preferably so adjusted as to just cause the grid potentials of the tubes 6 and 6' to rise at the peaks to points where space current will just about, but not quite, begin to flow. If now a signal wave is introduced from the microphone circuit, these peaks will operate from the characteristic curves on one or the other of the tubes. The dotted lines $q$ indicate the cut-off grid potential, at which further increase of grid voltage causes little or no additional space current flow and the solid lines $r$ indicate the intermediate position to which the grid voltage should rise during signaling. The operation is such as to cause the two separate parts of the carrier wave to go through separate wave formers. Thus, as indicated in Fig. 14, where S represents the signaling wave, there will be a positive series of impulses going through the wave former connected to tube 6 and a negative series of impulses connected to the tube 6', which, however, as will be noted, is in opposed relation so that each wave former will function in a similar manner, although out of phase with each other with respect to the signaling wave. The resultant wave produced in the antenna 33 approximates a modulated wave from which the unmodulated component of carrier frequency has been suppressed. The energy represented by the unmodulated component is not radiated. The wave formers 48 and 48' may consist of any desired number of tubes arranged in tandem or of a single tube if desired.

Figure 15:
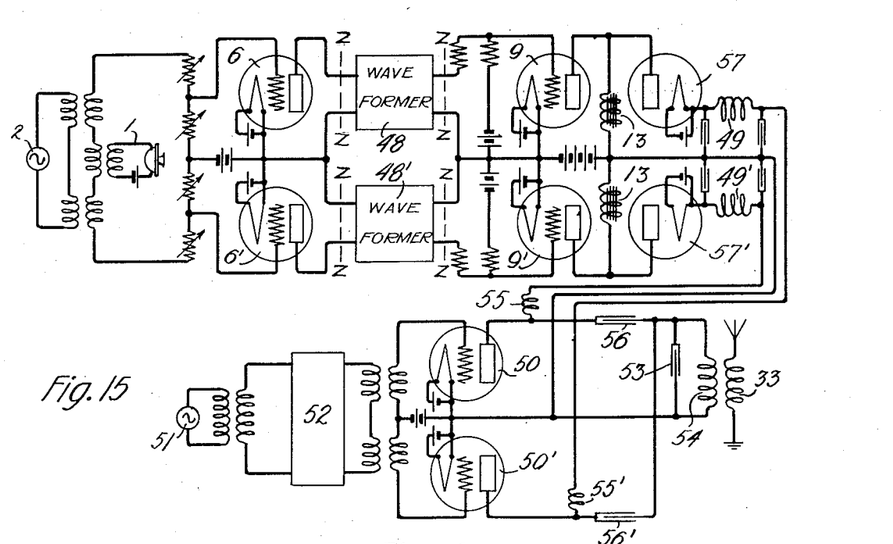
Fig. 15 is a circuit diagram of another arrangement for transmitting waves from which the unmodulated carrier component frequency has been suppressed.

In Fig. 15 is shown an arrangement adapted for producing a modulated wave of such high frequency that it cannot be transferred through the wave forming devices in an efficient manner owing to the internal capacities of the tubes. The source 2 in this arrangement may be of any suitable low or moderately high carrier wave frequency, as for example, 10,000 to 500,000 cycles per second. The parts of Fig. 15 which are identified by the same reference characters as in Fig. 12, function in a similar manner. Filters 49 and 49' correspond to filter 15 of Fig. 1 and are designed to pass a range of frequencies up to and including the highest frequencies essential for the reproduction of the modulating waves introduced in the filter circuit. Rectifiers 57 and 57' function in the same manner as similar device 14 of Fig. 1. That is, in cooperation with the inductances 13, tubes 9 and 9' and condensers 58 and 58' (which function in the same manner as condenser 18 of Fig. 1) they convert the series of impulses, corresponding to those illustrated in Fig. 14 after having been formed into equal amplitude rectangular impulses having different widths, into a wave having the form of the original signal wave. Each set of elements therefore reproduce, one half the signaling wave so that when such half waves are impressed upon the amplifiers 50 and 50' the resultant wave in the antenna circuit 33 will be a pure modulated wave. The amplifiers 50 and 50' are supplied at their input circuits with carrier waves of a much higher frequency than the source 2. These carrier waves are derived from the source 51 and amplified in a high frequency amplifier 52, after which they are impressed upon the input circuits of the tubes 50 and 50'. The output circuits of the tubes 50 and 50' are connected in opposed relation to a circuit comprising capacity 53 and inductance 54, preferably tuned to the high carrier frequency. The antenna 33 is coupled with the inductance 54 as shown. The space current supply for the tubes 50 nd 50' is thus derived from the waves supplied by the sources 1 and 2, amplified by the tubes 6 and 6', and transformed by the wave formers 48 and 48' and the tubes 9, 9', 30, 30' and their associated elements. The high frequency source 51 acts as a commutating arrangement to vary the impedance of the tubes 50, 50'. High frequency choke coils 55, 55' prevent the high carrier frequency current from flowing into the filters 49, 49'. The stopping condensers 56 and 56' are of relatively high impedance to speech frequency waves.

Figure 16:
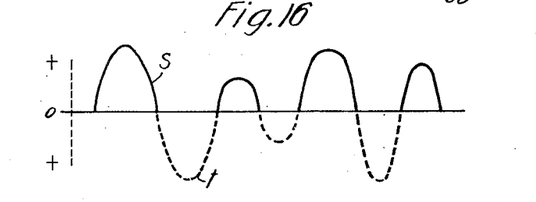
Fig. 16 is a diagram for explaining the operation of the arrangement of Fig. 15.

In Fig. 16 the curves $s$ and $t$ represent the current supply to the amplifiers 50 and 50' from the filters 49, 49'. The curve $s$ (whole line) indicates increasing current supply to the amplifier 50 as it recedes from the axis and the curve $t$ (dotted line) indicates increasing current to the amplifier 50' as it recedes from the axis.

From a consideration of the various arrangements herein specifically described, it will be apparent to those skilled in the art that a large number of combinations of high efficiency generating devices, wave forming devices, modulating devices and amplifying devices, all of which operate in accordance with the same general principles, may be made. For example, the elements 20, A, $A_2$, HG, SC, $A_1$, PS and $A_2$ of Fig. 1$^b$ may be substituted for the elements 51, 52 of Fig. 15.

Having described the various systems involving the invention, the various parts, circuits, combinations and methods which are believed to be novel are set forth in the appended claims.

I claim:

1. The method of modulation which comprises producing a series of impulses of duration varying in accordance with a signal and converting these into a corresponding series of impulses of amplitude varying in accordance with a signal.

2. The method of modulation which comprises producing voltage impulses of substantially flat topped wave form, and introducing thereinto a modulation variation which consists principally in changing the length or time duration of the successive impulses.

3. The method which comprises producing impulses which succeed each other at a rate above the usual frequency of audible speech waves and modulating said impulses in accordance with a speech wave by causing successive impulses thereof to vary in energy content principally by changing their duration in accordance with successively different instantaneous values of the amplitude or current energy of the speech wave.

4. A system comprising a wave generator and means for producing waves in which signals to be transmitted are represented by the duration and frequency of current impulses rather than by their amplitude.

5. The method which comprises producing a series of impulses of length or duration varied in accordance with a sound wave and converting the impulses into corresponding impulses of substantially uniform duration and of amplitude varied in accordance with the sound wave.

6. A system comprising a signaling wave source, means for producing impulses whose time duration is controlled by waves from said source, and means for producing impulses whose amplitude is controlled by said first named impulses.

7. The method which comprises producing a series of impulses of uniform amplitude and duration varied in accordance with a signal, causing each of these impulses to produce another impulse of amplitude varied in accordance with a signal, and utilizing the energy of the last mentioned impulses to actuate a device for producing modulated waves of variable amplitude.

8. A system for producing high power high frequency waves which comprises means for producing modulated waves, means for rectifying said modulated waves, a filter for freely passing the frequency of modulation and suppressing the wave frequency, means for passing said rectified waves through said filter, and means for producing modulated waves varied in accordance with the waves transferred through said filter.

9. The method of producing modulated waves of high power which comprises first producing modulated waves of low power, amplifying the power of said waves, converting the wave form during the power amplifying process, and restoring the wave form with greatly increased power at the close of the power amplifying process.

10. The method of amplifying speech modulated waves by means of electron discharge devices and an inductance which comprises impressing the waves upon successive electron discharge devices arranged in tandem and working each device at such potentials as to introduce additional odd multiple frequency components whereby square-topped waves are produced, and impressing the resultant waves upon said inductance.

11. The method of signaling by means of two substantially uni-directionally conducting devices which comprises producing flat-topped impulses in series, controlling said impulses in accordance with signals, and employing said impulses to commutate the flow of current from one of said devices to cause a flow of current through the other device.

12. In a system for signaling, means for forming two series of flat-topped impulses representing different portions of a modulated wave, means for passing each of said series through arrangements for forming flat-topped waves, means for producing waves from each of said resultant series of flat-topped waves, and means for impressing said waves upon a single transmission circuit.

13. In a system for signaling, means for forming two series of flat-topped impulses representing different portions of a modulated wave, means for passing each of said series through an arrangement for forming flat-topped waves, means for producing waves from each of said resultant series of flat-topped waves, and utilizing said waves to control higher frequency waves.

14. A modulating system comprising a discharge device, an input circuit for supplying thereto waves uniform in amplitude but variable in length, and an output circuit comprising elements whereby there are derived from said device waves variable in amplitude.

15. A system of modulation comprising means for producing a carrier wave, means for converting said carrier wave into a flat top wave, means for modulating said flat top wave in accordance with sound waves to produce waves varying in length, means for converting said waves varying in length into a wave varying in amplitude, means for suppressing said carrier wave, and means for impressing the modulated wave on a transmission circuit.

16. A system of modulation comprising a high frequency generator for producing a carrier wave, wave forming amplifiers for converting the carrier waves into a flat top wave, means for modulating said flat top wave in accordance with sound waves, to produce waves of constant amplitude but varying in length, means including inductance for converting said flat top waves varying in length into a wave of varying amplitude, a filter for suppressing said carrier wave, and means for impressing said modulated wave on a transmission circuit.

17. A system of modulation comprising a high frequency generator for producing a carrier wave, means for converting said carrier wave into a flat top wave, means for modulating said flat top wave in accordance with sound waves to produce waves of constant amplitude but varying length, a circuit including an inductance, capacity and a unidirectional conducting device for converting said flat top waves of varying length into a wave of varying amplitude, a filter for suppressing said carrier wave, and means for impressing said modulated wave on a transmission circuit.

18. A system of modulation comprising a high frequency generator for producing a carrier wave, wave forming amplifiers for converting different portions of said carrier wave into flat top waves, means for modulating said flat top waves in accordance with sound waves to produce impulses of constant amplitude and varying length, means for converting said impulses of varying length into waves of varying amplitude, and means for impressing said wave of varying amplitude upon a signal transmission circuit.

19. A system of modulation comprising a high frequency generator for producing a carrier wave, a plurality of sets of wave formers for converting different portions of said carrier wave into flat top waves, means for modulating said flat top waves in accordance with sound waves to produce waves of constant amplitude and varying length, a circuit including inductance, capacity and a unidirectional conducting device for converting said flat top waves of varying length into waves of varying amplitude, means for suppressing said carrier wave, and means for impressing said modulated wave on a transmission circuit.

20. An amplifying system comprising an electron discharge device having an output and an input circuit, a source of space discharge current included in the output circuit, means in the input circuit for reducing the current in the output circuit to zero in the absence of any applied waves in the input circuit, a circuit for impressing speech modulated high frequency waves on said input circuit to be amplified by said device and an outgoing circuit associated with the output circuit for conveying the amplified speech modulated high frequency waves.

In witness whereof, I hereunto subscribe my name this 1st day of August, A. D., 1923.

RAYMOND A. HEISING.